United States Patent [19]

Lee, II

[11] Patent Number: 4,699,715

[45] Date of Patent: Oct. 13, 1987

[54] FOLDED FILTER SCREEN

[75] Inventor: Leighton Lee, II, Guilford, Conn.

[73] Assignee: The Lee Company, Westbrook, Conn.

[21] Appl. No.: 846,963

[22] Filed: Apr. 1, 1986

[51] Int. Cl.$^4$ .................. B01D 29/06; B01D 35/02
[52] U.S. Cl. ......................... 210/448; 210/494.1;
55/521
[58] Field of Search ................ 210/448, 452, 493.1,
210/493.5, 499, 494.1, 494.2; 55/497, 500, 521,
529

[56] References Cited

U.S. PATENT DOCUMENTS

| | | | |
|---|---|---|---|
| 383,493 | 5/1888 | Sargent | 210/448 |
| 1,048,828 | 12/1912 | Haas | 210/448 |
| 2,420,414 | 5/1947 | Briggs | 210/493.1 |
| 3,426,910 | 2/1969 | Winzen | 210/499 |
| 3,458,050 | 7/1969 | Cooper | 210/448 |
| 4,231,767 | 11/1980 | Acker | 55/521 |

FOREIGN PATENT DOCUMENTS 719937 12/1954 United Kingdom .

Primary Examiner—Richard V. Fisher
Assistant Examiner—Linda S. Evans
Attorney, Agent, or Firm—Chilton, Alix & Van Kirk

[57] ABSTRACT

A filter screen for filtering contaminant particles from the fluid system of a hydraulic system comprises a screen which forms an axially extended convoluted nipple-like enclosure which opens through a passage formed in a base and terminates at a nose portion opposite the base. The screen has folded sides which comprise a plurality of angularly spaced alternating generally convex surface sections and generally concave surface sections generally symmetrical to the central screen axis. The screen is folded to form a continuous serpentine rim configuration at the base. The serpentine rim comprises an inner plurality of angularly spaced fold segments which engage the exterior surface of the base and an outer plurality of angularly spaced fold segments which overlap the inner fold segments in an alternating fashion. The screen is shaped and dimensioned so that the surface area of the screen generally increases from the nose to the base of the screen.

14 Claims, 7 Drawing Figures

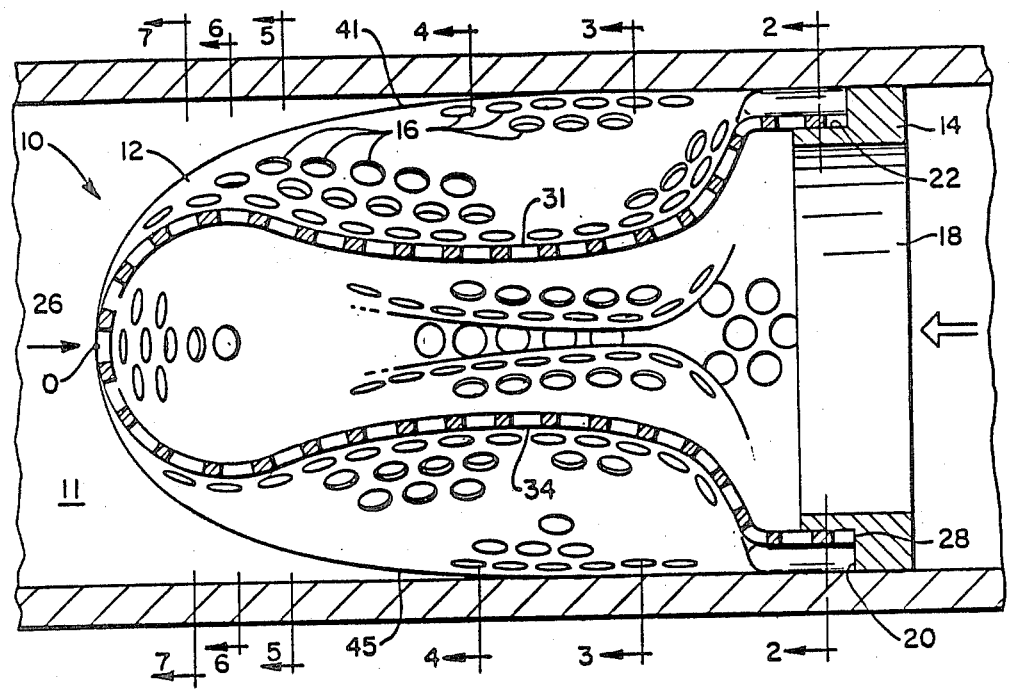
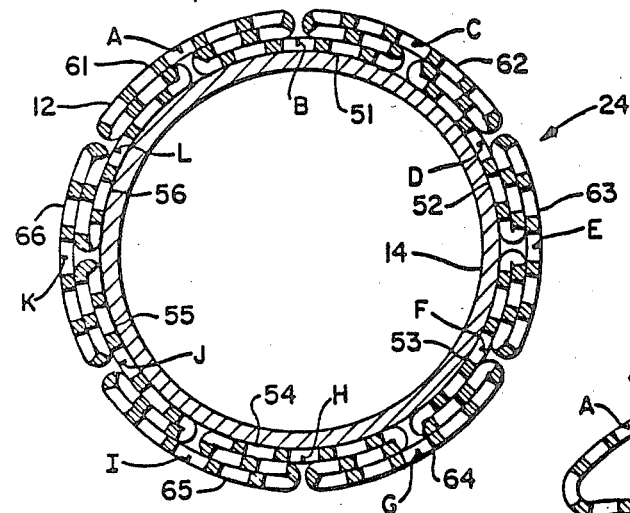
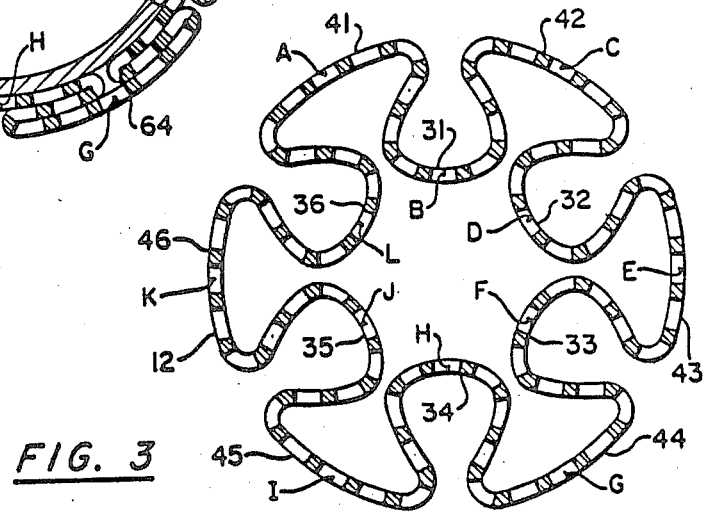
FIG. 1
FIG. 2
FIG. 3

FOLDED FILTER SCREEN

BACKGROUND OF THE INVENTION

The present invention relates generally to filter screens which are employed to filter contaminant particles from fluid systems. More particularly, the present invention is related to filter screens which function in conjunction with restrictors and valve components to filter contamination particles from the operative fluid of hydraulic systems.

Fluid contamination in the form of particulate matter in the fluid of hydraulic or fluid operated systems presents a potential source of component or system failure. Contamination particles may be introduced during the initial system assembly, during the maintenance of the system and during the testing of the components of the system. Some contamination particles are also ordinarily generated during system operation due to the normal wear in the system. Such particles may exceed 0.004 inches in diameter. To protect against component failure from the contamination particles, filter screens are commonly employed in conjunction with critical system components to screen out the large contamination particles.

Contamination induced component failure is even more critical in hydraulic systems wherein the valves and other critical components are highly miniaturized. The bulk of the contamination is preferably removed by system filtration. However, secondary or back-up filtration is often highly desirable. Filter screens, having a substantially cylindrical form or a folded cup-like form, are conventionally employed in cooperation with the system components to provide a last-chance type filter mechanism.

Accordingly, a principal aim of the present invention is to provide a new and improved filter screen for use in filtering relatively large contaminant particles from a hydraulic system which filter screen has a rugged construction, a relatively high fluid flow capacity, bidirectional flow capability and a large screen opening area reflected in a very high screen surface area to volume ratio.

SUMMARY OF THE INVENTION

Briefly stated, the invention in a preferred form is a filter screen comprising a base which forms a central fluid passage and an exterior surface which surrounds the passage. A screen is mounted to the base to form an axially extending convoluted nipple-like enclosure opening through said fluid passage and terminating in a nose which is axially opposite the base. The screen has folded sides which are generally symmetrical about a central axis through the base and nose. The folded sides comprise a plurality of angularly spaced, alternating generally convex surface sections and generally concave surface sections which are generally symmetrical to the central axis. The folded sides at a first axial position have a continuous serpentine configuration which comprises an inner plurality of angularly spaced fold segments engaging the base exterior surface and an outer plurality of angularly spaced fold segments overlapping the inner fold segments in an alternating fashion. The folded sides at a second axial position have a continuous star-like configuration forming a radially inner set of vertex defining surface sections in general angular alignment with the inner fold segments and an angularly alternating radially outer set of vertex defining surface sections in general angular alignment with the outer fold segments with the surface area of the screen generally increasing from the nose to the base.

The base may take the form of a bushing having a generally cylindrical exterior surface and a circumferential shoulder which abuts against an end edge portion of the screen. In a preferred form, there are at least four or more preferably six inner fold segments. The screen forms a multiplicity of generally uniformly dimensioned openings which are generally uniformly distributed throughout the screen. The serpentine configuration further comprises a pair of opposing zig-zag fold segments connecting between the overlapping inner and outer fold segments. In a preferred form, the screen is formed from a disc-shaped screen sheet.

BRIEF DESCRIPTION OF THE DRAWINGS

FIG. 1 is an axial sectional view of a filter screen in accordance with the present invention, said screen being positioned in a fluid passage.

FIG. 2 is a cross-sectional view of the filter screen of FIG. 1 taken along the line of 2—2;

FIG. 3 is a cross-sectional view of the filter screen of FIG. 1 taken along the line of 3—3;

DETAILED DESCRIPTION OF THE INVENTION

Figure 4:
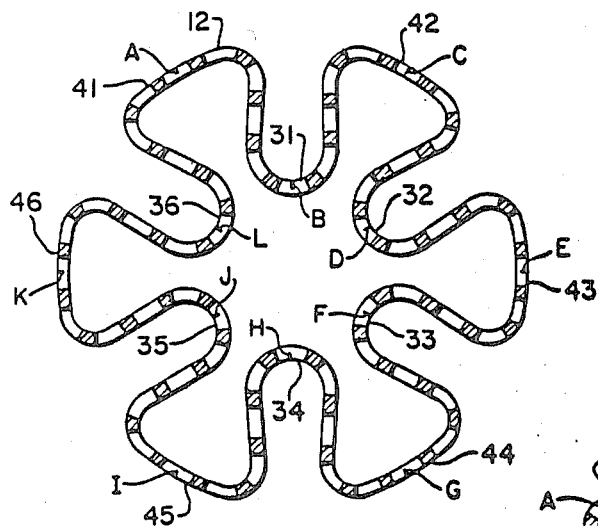
FIG. 4 is a cross-sectional view of the filter screen of FIG. 1 taken along the line of 4—4.

With reference to the drawings wherein like numerals represent like parts throughout the figures, a filter screen in accordance with the present invention is generally designated by the numeral 10. Filter screen 10 is adapted for mounting in a fluid passageway 11 of a hydraulic or pneumatic system in close conjunction with a valve or other system component (not illustrated) for providing a protective last-chance filter screen for filtering contaminants from the motive fluid of the system. The filter screen 10 may be incorporated into the component structure to form an integrated assembly or may be separately mounted to the component. It should be appreciated that filter screen 10 in a preferred form has a relatively compact miniaturized configuration. For example, in one embodiment, the length of the screen is on the order of 0.3 inches and the diameter of the screen is less than 0.2 inches.

Filter screen 10 is preferably a two-piece assembly formed from a disc-shaped screen sheet 12 and a bushing 14 which forms the base of the filter screen. Sheet 12 is suitably folded and shaped to form the illustrated filter screen 10. In one embodiment, sheet 12 is formed from a ⅝ inch diameter disc of stainless steel having a thickness of 0.005 inches. The disc is suitably etched to form a multiplicity of small uniformly spaced openings 16 having a substantially uniform diameter and uniformly distributed throughout the disc. The openings may also be formed by drilling. The dimensions of openings 16 are pre-selected in accordance with the filter requirements. For example, the openings may have a nominal diameter of 0.004 inches, 0.006 inches, 0.008 inches or 0.0015 inches depending on the contaminant particle size to be filtered from the fluid system by the filter screen. It should be appreciated that ordinarily filter screen 10 is employed in combination with a system filtration system and is not the sole filtering component for the fluid system.

Filter screen 10 has a sturdy, rugged construction and is adapted for bi-directional flow in the general axial direction of the arrows. Screen sheet or disc 12 is folded and shaped to present a very large ratio of screen opening area to occupied screen volume while providing a relatively high capacity for fluid flow.

Bushing 14 is formed from stainless steel and functions as a mounting and support base or retainer member for the filter screen 10. Bushing 14 defines a central cylindrical fluid passage 18. The diameter of passage 18 is relatively large compared to the diameter of passageway 11. The exterior surface of the bushing has a stepped concentric form which defines a circumferential transverse shoulder 20 and a cylindrical exterior mounting surface 22.

Disc 12 is suitably folded and shaped and engageably mounted to bushing 14 to form a convoluted quasi-nipple like screen enclosure. With reference to FIG. 2, the screen axially extends from a generally segmented overlapping cylindrical rim 24 surrounding surface 22 at end 28 to terminate at nose 26 to thereby form a screen enclosure having an open end through fluid passage 18 of the bushing and a closed end in the vicinity of nose 26. In an alternate embodiment, a central opening (not illustrated) extends through the screen at nose 26 to receive an axially projecting fastener for mounting the screen in position.

Disc 12 is shaped and folded to form a relatively smooth screen continuum which may be generally characterized as having a symmetrical convex region at the forward portion adjacent nose 26 and a set of axially progressive scallops or concave shaped indentations 31-36 as illustrated in FIG. 3. The indentations are symmetrically angularly located about the central axis through the filter enclosure. The maximum diameter of the screen gradually increases from nose 26 to segmented rim 24 and the concave indentations 31-36 gradually deepen to a maximum indentation depth at an intermediate axial position from where the indentation depth gradually recedes toward the bushing 14 as best illustrated in FIG. 1.

In order that the shape of the filter screen and the transformation of disc 12 from an essentially planar configuration to the illustrated folded convoluted shape may best be appreciated, the center of the disc is designated by the letter O in FIG. 1 and 12 equiangular spaced radial spokes have been designated by the letters A through L, respectively, in the drawings. A filter screen in accordance with the present invention may assume a number of sets of convex protrusions and concave alternating indentations such as, for example, 6, 8 or 12. In the drawings, six sets of alternating generally concave and convex surface sections are illustrated although the invention is not limited to a specific number of such sets of alternating surfaces. The concave surface sections 31-36 are substantially identical in shape and the convex surface sections are substantially identical in shape.

It will be appreciated that the angular mid-point of the concave indentations 31-36 extend through spokes B, D, F, H, J and L, respectively, while the angular mid-points of the convex protrusions extend through spokes A, C, E, G, I and K, respectively. The radially outwardly protruding convex surface segments are designated by the numerals 41 through 46. It should be appreciated that FIGS. 2 through 7 illustrate cross-sections through the folded disk in sequential axial relationship from the rim 24 defined by the circular circumferential edge of the disc to the closed end or nose 26 of the screen enclosure in the vicinity of disc center O. The length of the formed sections of the disc correspondingly progressively decreases from that of FIG. 2 to that of FIG. 7 since the circular section at a given radial position of the disc which defines the various sections increases as the radial distance from the center O of the disc increases.

Figure 5:
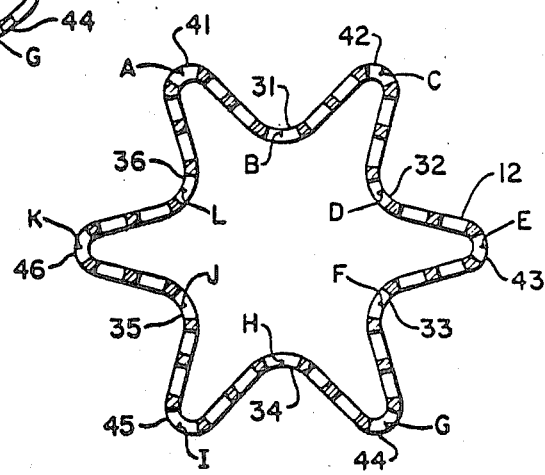
FIG. 5 is a cross-sectional view of the filter screen of FIG. 1 taken along the line of 5—5.
Figure 6:
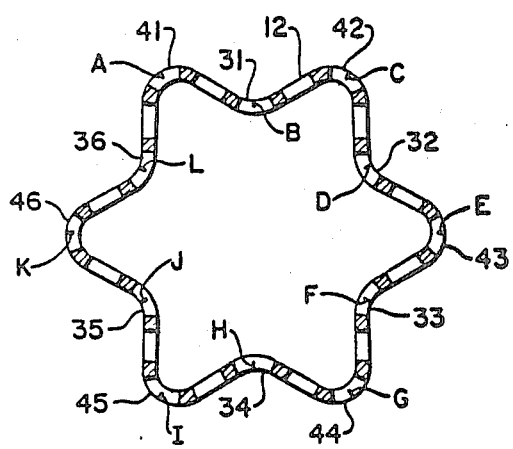
FIG. 6 is a cross-sectional view of the filter screen of FIG. 1 taken along the line of 6—6.
Figure 7:
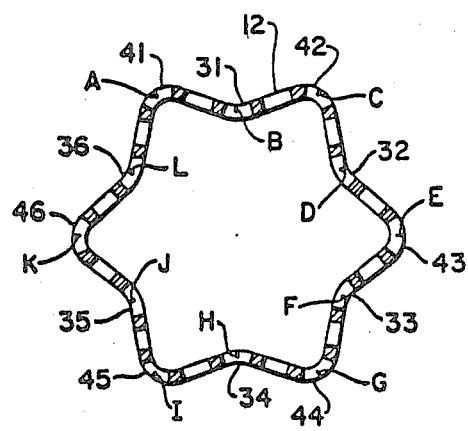
FIG. 7 is a cross-sectional view of the filter screen of FIG. 1 taken along the line of 7—7.

The disc 12 is centrally folded to form a convex forward surface in the area of nose 26 with a quasi six-sided star cross-sectional configuration as illustrated in respective FIGS. 7, 6 and 5 being progressively defined in accordance with the increasing axial distance from the nose. As the cross-sectional configurations progressively change from the sections illustrated in FIGS. 7, 6 and 5, the vertex points, i.e., the mid-points through spokes A through L, and hence the surface folds, become progressively sharper and more well defined as illustrated in the drawings.

At the intermediate axial locations, best illustrated in FIGS. 3 and 4, the concave indentation sections 31-36 are progressively folded inwardly toward the central axis to form a quasi six-sided petal type arrangement, as illustrated, wherein the alternate protrusion and indentation sections essentially form a set of six projecting three-sided petal configurations.

With specific reference to FIG. 2, the formed segmented mounting rim 24 is crimped against surface 22 of the bushing 14 in an arrangement wherein the alternating protrusion surface segments and indentation surface segments are forced into a multi-layer, side-by-side, surface-to-surface type engagement against the receiving cylindrical exterior surface 22 to form an angularly spaced set of overlapping cylindrical surface segments as best illustrated in FIGS. 1 and 2. Six inner cylindrical surface segments 51-56 angularly align with concave surface segments 31-36 and the six outer cylindrical surface segments 61-66 angularly align with convex surface segments 41-46. The inner screen surfaces 51-56 and the outer screen surfaces 61-66 form alternating, overlapping cylindrical segments with intermediate connecting segments being disposed in alternating pleated or zig-zag fashion between the outer series of segments 61-66 and the inner series of segments 51-56. It should be appreciated that the tri-layer screen configuration forming the base screen rim 24 provides a somewhat smaller effective opening area through the screen since the openings of the overlapping screen segments ordinarily do not align and therefore the openings are partially or fully closed by the overlapping screen segments.

As the axial distance from the nose increases, the screen area increases. Consequently, a larger surface area or a larger cumulative effective opening is presented to the fluid flow path as the axial distance through the screen increases. It should be appreciated that the protrusion segments 61-66 and the indentation segments 51-56 have a slight continuous curvature but generally extend in quasi-parallel relationship to the central axis of the filter screen 10. The axial fluid flow through passageway 11 in the direction of the bold arrow essentially washes along the sides of the formed screen to force the screened particulate matter toward the bushing 14 or base of the screen thereby providing a self-cleansing function. In addition, as the fluid flow progresses in the axial direction of the bold arrow, the pressure differential across the screen necessarily drops while the effective screen area, i.e., the effective opening, to the fluid flow correspondingly increases. Therefore a generally constant filtering rate is provided along the axial length of the filter screen.

It should be appreciated that the screen is configured so that the foregoing described filter rate properties apply to fluid flow in either axial direction. The folds which define the alternating protrusion and indentation surface sections enhance the structural rigidity of the filter screen and impart a sturdy construction to the formed filter.

Because of the compact multi-layer, overlapping screen configuration at the base, the central passage 18 through the base may have a greater diameter than is possible with conventional folded screens which do not have the described multi-layer base configuration and wherein the base accommodates radially projecting folds extending to the base portion of the screen.

The filter screen 10 as described is formed by a cooperating die press mounted to a rotary table assembly. A screen disc is progressively subjected to a series of cooperating upper and lower dies. The dies have cooperating upper and lower generally U-shaped mold surfaces with complementary scallop-like sections similar to the concave indentation shapes previously described for the formed screen. As the formed disc is sequentially subjected to dies having progressively more sharply defined indentations and protrusions which approach the general filter shape illustrated in the drawings, the disc is sequentially transformed to the previously described shape. In the final press stage, the radial peripheral portions of the disc adjacent rim 24 are forcefully crimped. Bushing 14 is subsequently mounted to the formed screen, brazed in place and the screen assembly is discharged from the press.

It should be appreciated that 8, 12 or any other number of sets of alternating surface indentations and protrusions may be formed. While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A filter screen comprising:
    a base forming a central fluid passage and having an exterior surface surrounding said passage;
    a screen mounted to said base to form an axially extending convoluted nipple-like enclosure opening through said fluid passage and terminating at a nose portion axially opposite said base with the surface area of said screen generally increasing from the nose to the base;
    said screen having folded sides which are generally symmetrical about an axis through said base and nose comprising a plurality of angularly spaced, alternating generally convex surface sections and generally concave surface sections generally symmetrical to said axis;
    said folded sides at a first axial position having a continuous serpentine configuration comprising an inner plurality of angularly spaced fold segments engaging said base exterior surface and an outer plurality of angularly spaced fold segments overlapping said inner fold segments in alternating fashion, said inner and said outer fold segments extending angularly relative to said axis and in generally concentric relationship coaxial with said axis; and
    said folded sides at a second aixal position having a continuous star-like configuration forming a radially inner set of vertex defining surface sections in general angular alignment with said inner fold segments and an angularly alternating radially outer set of vertex defining surface sections in general angular alignment with said outer fold segments.

2. The filter screen of claim 1, wherein said base comprises a bushing having a generally cylindrical exterior surface and circumferential shoulder which abuts against an end portion of said screen.

3. The filter screen of claim 1 wherein the number of inner fold segments is at least 4.

4. The filter screen of claim 1, wherein the screen comprises means defining a multiplicity of generally uniformly dimensioned openings which are generally uniformly distributed throughout the screen.

5. The filter screen of claim 1 wherein the serpentine configuration further includes pairs of opposiing zig-zag fold segments connecting between the inner and outer fold segments.

6. The filter screen of claim 1 wherein said serpentine configuration forms a generally segmented cylindrical rim.

7. The filter screen of claim 1 wherein the screen comprises a folded disc-shaped screen sheet.

8. A filter screen comprising:
    a disc comprising means defining a plurality of openings and forming an axially extending convoluted nipple-like enclosure defining a fluid passage and having a rim and a nose portion axially opposite said rim;
    said disc having folded sides which are generally symmetrical about a central axis through said passage and nose comprising a plurality of angularly spaced, alternating generally convex surface sections and generally concave surface sections generally symmetrical to said axis;
    said rim having a continuous serpentine configuration comprising an inner plurality of angularly spaced fold segments and an outer plurality of angularly spaced fold segments overlapping said inner fold segments in alternating fashion, said serpentine configuration comprising pairs of opposing zig-zag fold segments connecting between the inner and outer fold segments; and
    said folded sides at an axial position between said rim and nose having a continuous star-like configuration forming a radially inner set of vertex defining surface sections in general angular alignment with said inner fold segments and an angularly alternating radially outer set of vertex defining surface sections in general angular alignment with said outer fold segments.

9. The filter screen of claim 8 wherein the nose is the central portion of the disc and the surface area of the disc generally increases as the axial distance from the nose to the rim increases.

10. The filter screen of claim 8 and further comprising a base having a generally cylindrical exterior surface which is engaged by the inner fold segments.

11. The filter screen of claim 8 wherein the number of inner fold segments is at least 6.

12. The filter screen of claim 8 wherein the disc comprises means defining a multiplicity of generally uniformly dimensioned openings which are generally uniformly distributed throughout the screen.

13. The filter screen of claim 8 wherein the serpentine configuration forms a generally segmented cylindrical rim.

14. A filter screen comprising:
 a disc comprising means defining a plurality of openings and folded to form an axially extending convoluted nipple-like enclosure having a rim and a nose axially opposite said rim, the surface area of said disc generally increasing as the axial distance from the nose increases;
 said disc having folded sides which are generally symmetrical about a central axis through said rim and nose and comprising a plurality of angularly spaced alternating generally convex surface sections and generally concave surface sections generally symmetrical to said axis;
 said rim having a continuous serpentine configuration comprising an inner plurality of angularly spaced fold segments and an outer plurality of angularly spaced fold segments overlapping said inner fold segments in alternating fashion, said inner and said outer fold segments being disposed in concentric relationship; and
 said folded sides at an axial position between said rim and nose having a continuous star-like configuration forming a radially inner set of vertex defining surface sections in general angular alignment with said inner fold segments and an angularly alternating radially outer set of vertex defining surface sections in general angular alignment with said outer fold segments.

* * * * *